(12) United States Patent
Smith et al.

(10) Patent No.: US 10,914,273 B2
(45) Date of Patent: Feb. 9, 2021

(54) METHOD AND APPARATUS FOR CONTROLLING AN INTERNAL COMBUSTION ENGINE

(71) Applicant: GM Global Technology Operations LLC, Detroit, MI (US)

(72) Inventors: Michael A. Smith, Clarkston, MI (US); Robert J. Gallon, Northville, MI (US); Michael P. Kaczmar, Farmington Hills, MI (US); Martino A. Casetti, Clarkston, MI (US); Eric M. Hall, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 16/354,690

(22) Filed: Mar. 15, 2019

(65) Prior Publication Data

US 2020/0291906 A1    Sep. 17, 2020

(51) Int. Cl.
| | |
|---|---|
| *F02M 26/43* | (2016.01) |
| *F02D 41/00* | (2006.01) |
| *F02B 37/16* | (2006.01) |
| *F02D 41/14* | (2006.01) |
| *F02M 26/05* | (2016.01) |
| *F02M 26/47* | (2016.01) |
| *F02B 37/24* | (2006.01) |

(52) U.S. Cl.
CPC ............ *F02M 26/43* (2016.02); *F02B 37/16* (2013.01); *F02B 37/24* (2013.01); *F02D 41/0007* (2013.01); *F02D 41/0072* (2013.01); *F02D 41/0087* (2013.01); *F02D 41/1454* (2013.01); *F02D 41/1461* (2013.01); *F02M 26/05* (2016.02); *F02M 26/47* (2016.02)

(58) Field of Classification Search
CPC ............ F01N 2270/10; F01N 2290/04; F01N 2340/06; F02M 2026/004; F02M 26/43; F02M 26/05; F02D 41/0072; F02D 41/0087; F02D 41/0077; F02D 41/0082
USPC ....... 60/602, 603, 605.2, 278, 280; 123/217, 123/406.48, 568.11–568.15, 198 F, 123/568.21, 568.31
See application file for complete search history.

(56) References Cited

U.S. PATENT DOCUMENTS

| | | | |
|---|---|---|---|
| 2019/0219006 A1* | 7/2019 | Gukelberger | F02M 26/43 |
| 2020/0182203 A1* | 6/2020 | Hong | F02M 26/43 |

* cited by examiner

*Primary Examiner* — Mark A Laurenzi
*Assistant Examiner* — Mickey H France
(74) *Attorney, Agent, or Firm* — Quinn IP Law

(57) ABSTRACT

An engine includes an air intake system, an exhaust system, a single-cylinder-sourced EGR system, an exhaust sensor that is disposed to monitor exhaust gas from the single one of the cylinders, and a diverter valve. A controller includes an instruction set that executable to determine operation of the engine in a fuel cut-off mode, discontinue fuel flow to the single one of the cylinders, divert exhaust gas from the single one of the cylinders to the air intake system, determine an airflow, temperature, and an equivalence ratio of the diverted exhaust gas from the single one of the cylinders, determine a mass flowrate of oxygen in the diverted exhaust gas, integrate the mass flowrate of oxygen in the diverted exhaust gas, and discontinue the diverting of the exhaust gas from the single one of the cylinders when the integrated mass flowrate of oxygen is greater than a threshold value.

17 Claims, 2 Drawing Sheets

METHOD AND APPARATUS FOR CONTROLLING AN INTERNAL COMBUSTION ENGINE

TECHNICAL FIELD

This disclosure relates to internal combustion engines that are fluidly coupled to exhaust aftertreatment systems, and methods for their control.

BACKGROUND

Internal combustion engines fluidly couple to exhaust aftertreatment systems, which include devices and systems that purify exhaust gases generated as byproducts of combustion during engine operation. Engine operation may be controlled in part to manage combustion such that byproducts of combustion are minimized. Byproducts of combustion may include unburned hydrocarbons, carbon monoxide, nitrides of oxide, which may be referred to as NOx molecules, and particulate matter. Engine operation may be monitored by one or more exhaust gas sensing devices that are disposed in the exhaust gas feedstream. Purifying exhaust gases may be accomplished by one or more devices that are configured to oxidize, reduce, filter and/or otherwise treat constituents of an exhaust gas feedstream, including but not limited to hydrocarbons, carbon monoxide, nitrides of oxygen (NOx), and particulate matter.

SUMMARY

A multi-cylinder internal combustion engine ("engine") is described, and includes an air intake system, an exhaust system, a single-cylinder-sourced exhaust gas recirculation (EGR) system that controllable to divert exhaust gas from a single cylinder to the air intake system of the engine, an exhaust sensor that is disposed to monitor the exhaust gas from the single cylinder, and a diverter valve that is disposed in the exhaust system to manage flow of exhaust gas between the single cylinder, the exhaust system and the single-cylinder-sourced EGR system. A controller is in communication with the exhaust sensor and the internal combustion engine, and is operatively connected to the diverter valve. The controller includes an instruction set that executable to determine operation of the engine in a fuel cut-off mode, discontinue fuel flow to the single cylinder, divert exhaust gas from the single cylinder to the air intake system, determine an airflow, temperature, and an equivalence ratio of the diverted exhaust gas from the single cylinder, determine a mass flowrate of oxygen in the diverted exhaust flow based upon the airflow, temperature, and equivalence ratio of the diverted exhaust gas from the single cylinder, integrate the mass flowrate of oxygen in the diverted exhaust gas, and discontinue the diverting of the exhaust gas from the single cylinder to the air intake system when the integrated mass flowrate of oxygen is greater than a threshold value.

An aspect of the disclosure includes the exhaust sensor being either a wide-range air/fuel ratio sensor or a NOx sensor.

Another aspect of the disclosure includes an engine air compressor being disposed in the exhaust system, wherein the instruction set executable to divert the exhaust gas from the single cylinder to the air intake system includes controlling the engine air compressor coincident with controlling the exhaust gas diverter valve to divert the exhaust gas from the single cylinder to the air intake system.

Another aspect of the disclosure includes controlling one of a waste gate or a position of vanes of the engine air compressor.

Another aspect of the disclosure includes determining an airflow, temperature, and an equivalence ratio of the exhaust gas that is diverted from the single cylinder, determining a mass flowrate of oxygen in the diverted exhaust gas based upon the airflow, temperature, and equivalence ratio of the diverted exhaust gas from the single cylinder, integrating the mass flowrate of oxygen in the diverted exhaust gas.

Another aspect of the disclosure includes discontinuing the diverting of the exhaust gas from the single cylinder to the air intake system when the integrated mass flowrate of oxygen is greater than a threshold value.

Another aspect of the disclosure includes diverting only a portion of the exhaust gas from the single cylinder to the air intake system.

Another aspect of the disclosure includes a method for operating an internal combustion engine (engine) including a single-cylinder-sourced EGR system controllable to divert exhaust gas from a single cylinder to an air intake system of the engine, wherein an exhaust sensor is disposed to monitor the exhaust gas from the single cylinder. The method includes exposing the exhaust sensor to a lean exhaust environment when the exposure of the exhaust sensor to the rich environment is greater than a threshold.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
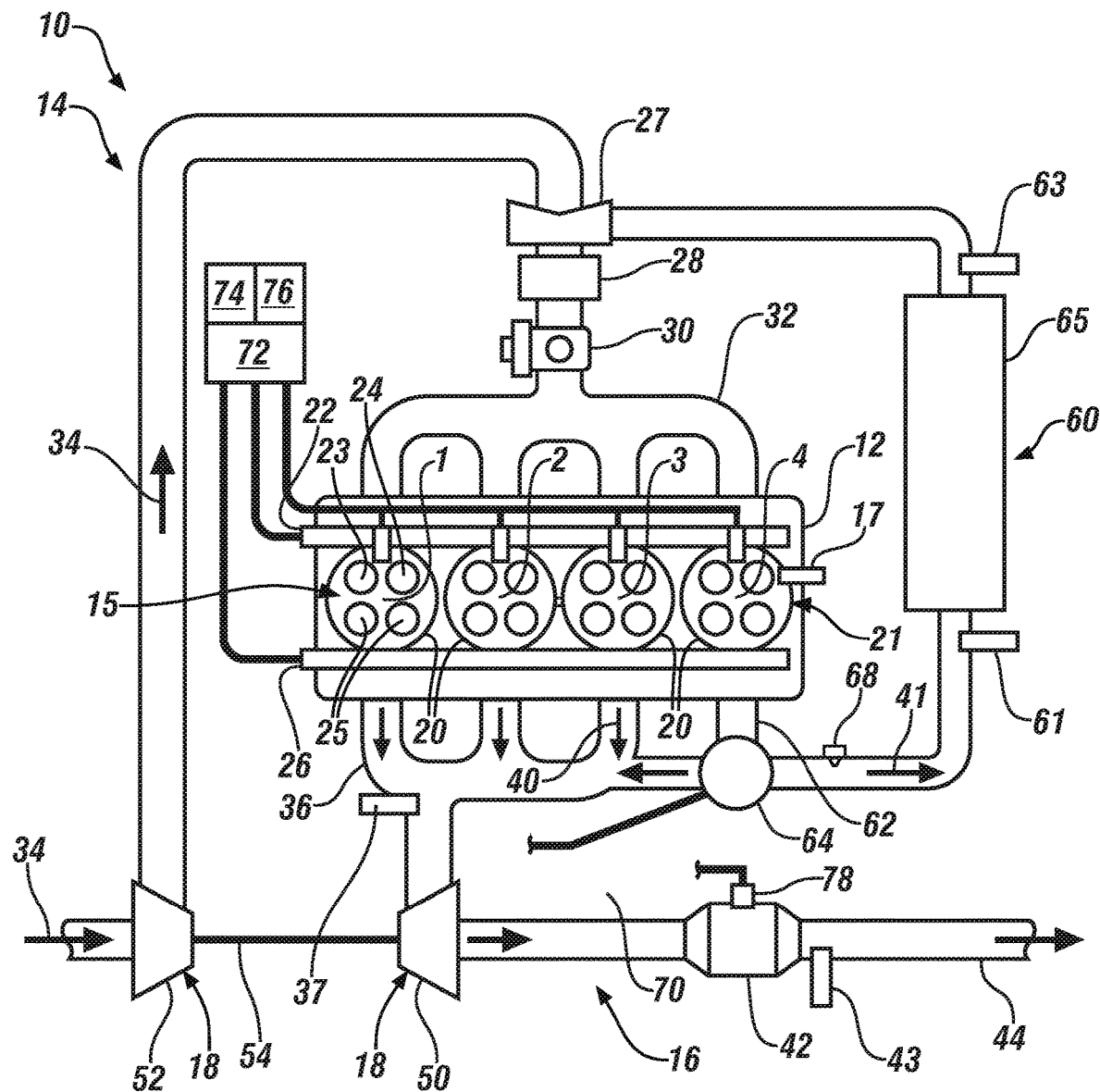
FIG. 1 schematically illustrates an internal combustion engine including a single-cylinder-sourced EGR system and an exhaust gas aftertreatment system, in accordance with the disclosure.

Referring now to the drawings, wherein the depictions are for the purpose of illustrating certain exemplary embodiments only and not for the purpose of limiting the same, FIG. 1 schematically illustrates a four-cycle internal combustion engine assembly (engine) 10 including an engine subassembly 12, an air intake system 14, an exhaust system 16 and a single-cylinder-sourced exhaust gas recirculation (EGR) system 60. In one embodiment and as shown, an intake air compressor 18, e.g., a turbocharger may be employed. Alternatively, an engine-driven or electric motor-driven supercharger may be employed. The engine 10 may be deployed on a vehicle to provide propulsion power, wherein the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. As employed herein, the term "upstream" and related terms refer to elements that are towards an origination of a flow stream relative to an indicated location, and the term "downstream" and related terms refer to elements that are away from an origination of a flow stream relative to an indicated location.

The engine 10 may be configured as a high-compression-ratio spark-ignited internal combustion engine, and may also include another suitable internal combustion engine that combusts hydrocarbon fuels to generate torque. The engine subassembly 12 preferably includes an engine block defining a plurality of cylinders 20 (referenced as cylinders 1-4), a corresponding plurality of pistons that reciprocate within the cylinders 20, a rotatable crankshaft that couples to the pistons, a cylinder head 21, and other engine components such as piston connecting rods, pins, bearings and the like. Each of the cylinders 20 with corresponding piston and portion of the cylinder head 21 defines a variable-volume combustion chamber 15. Each of the plurality of cylinders 20 selectively fluidly communicates with the air intake system 14 via first and second intake valves 23, 24, respectively, to receive fresh/oxygenated air, and each of the plurality of cylinders 20 selectively fluidly communicates with the exhaust system 16 via exhaust valves 25 to expel the byproducts of combustion. While the illustrated engine 10 depicts an inline 4-cylinder (I4) engine, the present technology is equally applicable to other engine configurations, including, by way of non-limiting examples, I2, I3, I5 and I6 engines, or V-2, V-4, V-6, V-8, V-10, and V-12 engines, among others.

The cylinder head 21 includes a plurality of intake ports and associated first and second intake valves 23, 24, respectively, for each of the cylinders 20, a plurality of exhaust ports and associated exhaust valves 25 for each of the cylinders 20, and other ports and associated components including fuel injectors, spark igniters and combustion sensors. The plurality of first and second intake valves 23, 24 are disposed between the air intake system 14 and a corresponding one of the cylinders 20. The plurality of exhaust valves 25 are disposed between a corresponding one of the cylinders 20 and the exhaust system 16. The exhaust system 16 preferably includes a first exhaust manifold 36 and a second exhaust manifold 62 that are disposed to entrain and direct exhaust gases that are expelled from the engine 10 via openings of the exhaust valves 25.

The first and second intake valves 23, 24 operatively connect to a variable intake valve activation system 22 that preferably includes a rotatable camshaft whose rotation is indexed to rotation of the crankshaft. The exhaust valves 25 operatively connect to an exhaust valve activation system 26 that preferably includes a rotatable camshaft whose rotation is indexed to rotation of the crankshaft. In one embodiment, the exhaust valve activation system 26 may be variably controlled, as described herein.

The air intake system 14 can generally include one or more of, a fresh-air inlet, an exhaust gas recirculation (EGR) mixer 27, a charge air cooler 28, a throttle 30 and an intake manifold 32. During operation of the engine 10, fresh air or intake air 34 can be ingested by the air intake system 14 from the atmosphere through an associated air-cleaner assembly via the fresh-air inlet. The throttle 30 can include a controllable baffle that is configured to regulate the total flow of air through the air intake system 14, and ultimately into the cylinders 20 via the intake manifold 32. Airflow from the intake manifold 32 into each of the cylinders 20 is controlled by the first and second intake valves 23, 24, the activation of which is controlled by the variable intake valve activation system 22. Exhaust flow out of each of the cylinders 20 to the first and second exhaust manifolds 36, 62 is controlled by the exhaust valve(s) 25, the activation of which may be controlled by the exhaust valve activation system 26.

The term "single-cylinder-sourced EGR system" as employed herein refers to a system in which all exhaust gases generated in one or a plurality of the cylinders 20 are separated and routed to the air intake system 14. In one embodiment, the single-cylinder-sourced EGR system 60 includes the second exhaust manifold 62, a controllable diverter valve 64, and an in-stream EGR heat exchanger 65 that fluidly connects to the air intake system 14 at an EGR mixer 27 that is located upstream of the charge air cooler 28 and the throttle 30. The second exhaust manifold 62 entrains exhaust gas flow from a single cylinder, e.g., cylinder 4 in this embodiment, and channels such flow to the air intake system 14 when the diverter valve 64 is controlled to a first position. The second exhaust manifold 62 entrains and channels exhaust gas flow from cylinder 4 to the exhaust system 16 via a second conduit 70 when the diverter valve 64 is controlled to a second position. Other elements preferably include the in-stream EGR heat exchanger 65 that is configured to reduce or otherwise manage temperature of the recirculated exhaust gas 41, a first temperature sensor 61 that is disposed to monitor temperature of the recirculated exhaust gas 41 upstream of the in-stream EGR heat exchanger 65 and a second temperature sensor 63 that is disposed to monitor temperature of the recirculated exhaust gas 41 downstream of the in-stream EGR heat exchanger 65. Thus, the single-cylinder-sourced EGR system 60 fluidly communicates with the air intake system 14 to route the recirculated exhaust gas 41 to the air intake system 14. This recirculated exhaust gas 41 can mix with the fresh air 34 within the EGR mixer 27 to dilute the oxygen content of the intake air charge. In one embodiment of the engine 10 employing the single-cylinder-sourced EGR system 60, the magnitude of EGR dilution of the intake air charge is approximately a ratio of the quantity of dedicated EGR cylinders to the total quantity of cylinders. In FIG. 1, one cylinder, i.e., cylinder 4 supplies dedicated EGR for an embodiment of the engine 10 that has a total of 4 cylinders so EGR dilution is approximately 25%. The use of the single-cylinder-sourced EGR system 60 can increase fuel efficiency in spark ignition engines. Furthermore, the single-cylinder-sourced EGR system 60 can reduce the combustion temperature and emission production from the engine 10. The first exhaust gas 40 is produced by the remaining three cylinders 20 (i.e., cylinders 1-3) and is expelled from the engine 10 via the exhaust system 16 through the aftertreatment device 42.

The single-cylinder-sourced EGR system 60 recirculates a portion of an exhaust gas feedstream to the air intake system 14, thus introducing inert gas into intake air, which is intended to dilute the oxygen content in the intake air to reduce cylinder combustion temperatures and thus reduce engine-out NOx emissions. The single-cylinder-sourced EGR system 60 employs recirculated exhaust gas from a single one of the cylinders, e.g., cylinder 4 in this embodiment. Byproducts of combustion, e.g., soot, may precipitate onto a sensing surface of an exhaust gas sensor that is disposed to monitor exhaust gas in the single-cylinder-sourced EGR system 60, e.g., third exhaust gas sensor 68. Deposition of precipitates onto the sensing surface of the third exhaust gas sensor 68 may affect sensitivity of its signal output, including affecting either response time or accuracy of the signal output.

The variable intake valve activation system 22 includes mechanisms and control routines that interact with the intake camshaft(s) to control the openings and closings of the first and second intake valves 23, 24, including selectively deactivating one or both of the first and second intake valves 23, 24. One mechanization that may be configured to individually selectively deactivate one or both the first and second intake valves 23, 24 includes stationary hydraulic lash adjusters (SHLA) and roller finger followers (RFF). Another mechanization that may be configured to individually selectively deactivate one or both the first and second intake valves 23, 24 includes an intake camshaft and related componentry that includes a sliding cam having multiple cam lobes that may be selectively disposed to interact with and control openings and closings of one or both of the first and second intake valves 23, 24. SHLAs, RFFs and sliding cam mechanizations are known to those skilled in the art.

Controlling the variable intake valve activation system 22 to control openings and closings of the first and second intake valves 23, 24 includes opening both the first intake valve 23 and the second intake valve 24 during the intake stroke of the combustion cycle for each of the cylinders 20 under certain operating conditions. This further includes controlling the variable intake valve activation system 22 to selectively deactivate one of the first and second intake valves 23, 24 such that the deactivated valve does not open during the intake stroke of the combustion cycle for each of the cylinders 20. This may include controlling the variable intake valve activation system 22 to activate only the first intake valve 23 while deactivating the second intake valve 24 for each of the cylinders 20 such that the deactivated second intake valve 24 does not open during the intake stroke of the combustion cycle for each of the cylinders 20 under certain operating conditions. This may include controlling the variable intake valve activation system 22 to deactivate only the first intake valve 23 while activating the second intake valve 24 for each of the cylinders 20 under certain operating conditions such that the deactivated first intake valve 23 does not open during the intake stroke of the combustion cycle for each of the cylinders 20 under certain operating conditions. Such operations are described with reference to FIGS. 2-1 through 2-6.

In one embodiment, the exhaust valve activation system 26 may include a variable camshaft phaser (VCP)/variable lift control (VLC) device that interacts with the exhaust camshaft(s) to control the openings and closings of the exhaust valves 25. Controlling the openings and closings of the first and second intake valves 23, 24 and the exhaust valves 25 can include controlling magnitude of valve lift and/or controlling phasing, duration or timing of valve openings and closings. The exhaust valve activation system 26 including the VCP/VLC device is disposed to control interactions between the exhaust valves 25 and an exhaust camshaft in one embodiment. Alternatively, the exhaust valves 25 interact directly or via followers with an exhaust camshaft. The rotations of the intake and exhaust camshafts are linked to and indexed, variably in the case of VCP application, to rotation of the engine crankshaft, thus linking openings and closings of the intake and exhaust valves 23 and 25 to positions of the crankshaft and the pistons housed in the cylinders 20.

Reciprocating movement of each of the pistons in its corresponding cylinder is between a piston bottom-dead-center (BDC) location and a piston top-dead-center (TDC) location in concert with rotation of the crankshaft. Engines operating with a four-stroke engine cycle sequentially execute a repeated pattern of intake, compression, power and exhaust strokes. During the compression stroke, a fuel/air charge in the combustion chamber 15 is compressed by rotation of the crankshaft and movement of the piston in preparation for ignition. The intake valve 23 and the exhaust valve 25 are closed during at least a portion of the compression stroke. Closing of the intake valve 23 can be controlled by controlling the variable intake valve activation system 22, resulting in controlling an effective compression ratio. The effective compression ratio is defined as a ratio of a volumetric displacement of the combustion chamber 15 at closing of the intake valve 23 and a minimum volumetric displacement of the combustion chamber 15, e.g., when the piston is at TDC. The effective compression ratio may differ from a geometric compression ratio, which is defined as a ratio of a maximum volumetric displacement of the combustion chamber 15 occurring at BDC and the minimum volumetric displacement of the combustion chamber 15 occurring at TDC without regard to closing time of the intake valve 23. An early or delayed closing of the intake valve 23 may trap less air in the combustion chamber 15, thus decreasing pressure and therefore decreasing temperature in the combustion chamber 15 during combustion. In one embodiment, fuel is metered and injected into the combustion chamber 15 during the intake stroke. One fuel injection event may be executed to inject fuel; however, multiple fuel injection events may be executed. In one embodiment, fuel is injected early enough in the intake stroke to allow adequate premixing of the fuel/air charge in the combustion chamber 15.

Referring again to FIG. 1, the charge air cooler 28 can be disposed between the EGR mixer 27 and the throttle 30. In general, the charge air cooler 28 can be a radiator-style heat exchanger that uses a flow of atmospheric air or liquid coolant to cool an intake air charge that is a mixture of fresh air and recirculated exhaust gas. As may be appreciated, the intake air charge can be warmer than atmospheric temperature due to the pressurization via the compressor 52, in conjunction with the mixing of the higher temperature recirculated exhaust gas 41. The charge air cooler 28 can cool the gas mixture to increase its density/volumetric efficiency, while also reducing the potential for abnormal combustion such as pre-ignition or knock.

The exhaust gas passes through an aftertreatment device 42 to catalyze, reduce and/or remove exhaust gas constituents prior to exiting the exhaust system 16 via a tailpipe 44. The aftertreatment device 42 can include one or combinations of catalytic devices, including, e.g., a three-way catalytic device, an oxidation catalyst, a hydrocarbon trap, a NOx adsorber, or any other suitable components and accompanying pipes and valves that function to oxidize, reduce, and otherwise catalyze and/or remove various exhaust gas constituents prior to exiting the exhaust system 16.

The air intake system 14 and the exhaust system 16 can be in mechanical communication through the intake air compressor 18. The intake air compressor 18 is in fluid communication with the exhaust system 16 and the intake air compressor 18 expels the first exhaust product 40. The intake air compressor 18 can include a turbine 50 in fluid communication with the exhaust system 16 and a compressor 52 in fluid communication with the air intake system 14. The turbine 50 and the compressor 52 can be mechanically coupled via a rotatable shaft 54. The intake air compressor 18 can utilize the energy of the first exhaust product 40 flowing from the engine 10 to spin the turbine 50 and the compressor 52. The rotation of the compressor 52 draws fresh intake air 34 in from the fresh air inlet and compresses the intake air 34 into the remainder of the air intake system 14. The first exhaust product 40 is expelled through the intake air compressor 18. Once the first exhaust product 40 is expelled from the intake air compressor 18, the first exhaust product 40 flows toward the aftertreatment device 42.

Operation of the engine 10 can be monitored by a plurality of sensing devices. By way of non-limiting examples, the sensing devices may include a combustion sensor 17 that is disposed to monitor an engine parameter that is associated with combustion in each cylinder, a first exhaust gas sensor 37 that is disposed in the first exhaust manifold 36, a second exhaust gas sensor 43 that is disposed in the exhaust gas feedstream downstream of the aftertreatment device 42, and a third exhaust gas sensor 68 that is disposed to monitor the exhaust gas feedstream associated with operation of the single-cylinder-sourced EGR system 60. The third exhaust gas sensor 68 may be a wide-range air/fuel ratio sensor, a NOx sensor, an oxygen sensor, or another device. Each of the first, second and third exhaust gas sensors 37, 43, and 68 may be fabricated as a planar-type zirconium oxide dual cell device having a sensing element and an integrated electrically-powered heating element in one embodiment. Other sensors for monitoring the exhaust gas feedstream may include, by way of examples, a temperature sensor 78 that is disposed to monitor temperature of the aftertreatment device 42, the first temperature sensor 61 that is disposed to monitor temperature of recirculated exhaust gas upstream of the in-stream EGR heat exchanger 65 and the second temperature sensor 63 that is disposed to monitor temperature of recirculated exhaust gas downstream of the in-stream EGR heat exchanger 65.

The combustion sensor 17 may be disposed to monitor an engine parameter associated with combustion in each cylinder, and may be in the form of an in-cylinder pressure sensor in one embodiment. Alternatively, the combustion sensor 17 may be in the form of a rotational speed sensor that is disposed to monitor rotational speed and position of the crankshaft, with accompanying algorithms to evaluate crankshaft speed variations, or another suitable combustion monitoring sensor. The aforementioned sensors are provided for purposes of illustration. Any one of or all of the aforementioned sensors may be replaced by other sensing devices that monitor a parameter associated with operation of the engine 10, or may instead be replaced by an executable model to derive a state of an engine operating parameter.

A controller 72 can be part of an electronic control module that is in communication with various components of the vehicle. The controller 72 includes a processor 74 and a memory 76 on which is recorded instructions for communicating with the diverter valve 64, the variable intake valve activation system 22, the intake air compressor 18, the aftertreatment device 42, etc. The controller 72 is configured to execute the instructions from the memory 76, via the processor 74. For example, the controller 72 can be a host machine or distributed system, e.g., a computer such as a digital computer or microcomputer, acting as a vehicle control module, and/or as a proportional-integral-derivative (PID) controller device having a processor, and, as the memory 76, tangible, non-transitory computer-readable memory such as read-only memory (ROM) or flash memory. The controller 72 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 72 can include all software, hardware, memory 76, algorithms, calibrations, connections, sensors, etc., necessary to monitor and control the diverter valve 64, the variable intake valve activation system 22, the intake air compressor 18, the aftertreatment device 42, etc. As such, a control method can be embodied as software or firmware associated with the controller 72. It is to be appreciated that the controller 72 can also include any device capable of analyzing data from various sensors, comparing data, making the necessary decisions required to control and monitor the diverter valve 64, the variable intake valve activation system 22, the intake air compressor 18, the aftertreatment device 42, etc.

Communication between controllers, and communication between controllers, actuators and/or sensors may be accomplished using a direct wired link, a networked communications bus link, a wireless link or any another suitable communications link. Communication includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

The controller 72 includes the processor 74 and tangible, non-transitory memory 76 on which is recorded executable instructions. The controller 72 is configured to control the variable intake valve activation system 22 and the diverter valve 64 to route the recirculated exhaust gas 41. This includes the controller 72 configured to actuate the diverter valve 64 in the first position to route the recirculated exhaust gas 41 toward the aftertreatment device 42 and bypass the single-cylinder-sourced EGR system 60, and also configured to actuate the diverter valve 64 in the second position to route the recirculated exhaust gas 41 through the single-cylinder-sourced EGR system 60 back to the air intake system 14. The engine subassembly 12, variable intake valve activation system 22 and single-cylinder-sourced EGR system 60 that are described with reference to FIG. 1 can be advantageously controlled to achieve combustion stability across the engine speed/load operating range.

Operation of the single-cylinder-sourced EGR system 60 may include operating with the single cylinder, e.g., cylinder 4, being at a rich air/fuel ratio for a prolonged period during engine operation, resulting in the third exhaust gas sensor 68 being exposed to a rich air/fuel ratio for a prolonged period of time. Precise control of the air/fuel ratio in the single cylinder, e.g., cylinder 4 is required for optimum operation of the single-cylinder-sourced EGR system 60, with such control being based upon feedback from the third exhaust gas sensor 68. Prolonged operation at a rich air/fuel ratio can result in precipitation and deposition of combustion particles, e.g., soot, onto a surface of an electrode of the third exhaust gas sensor 68, which may affect its sensing capability, its performance and/or its long-term durability.

Figure 2:
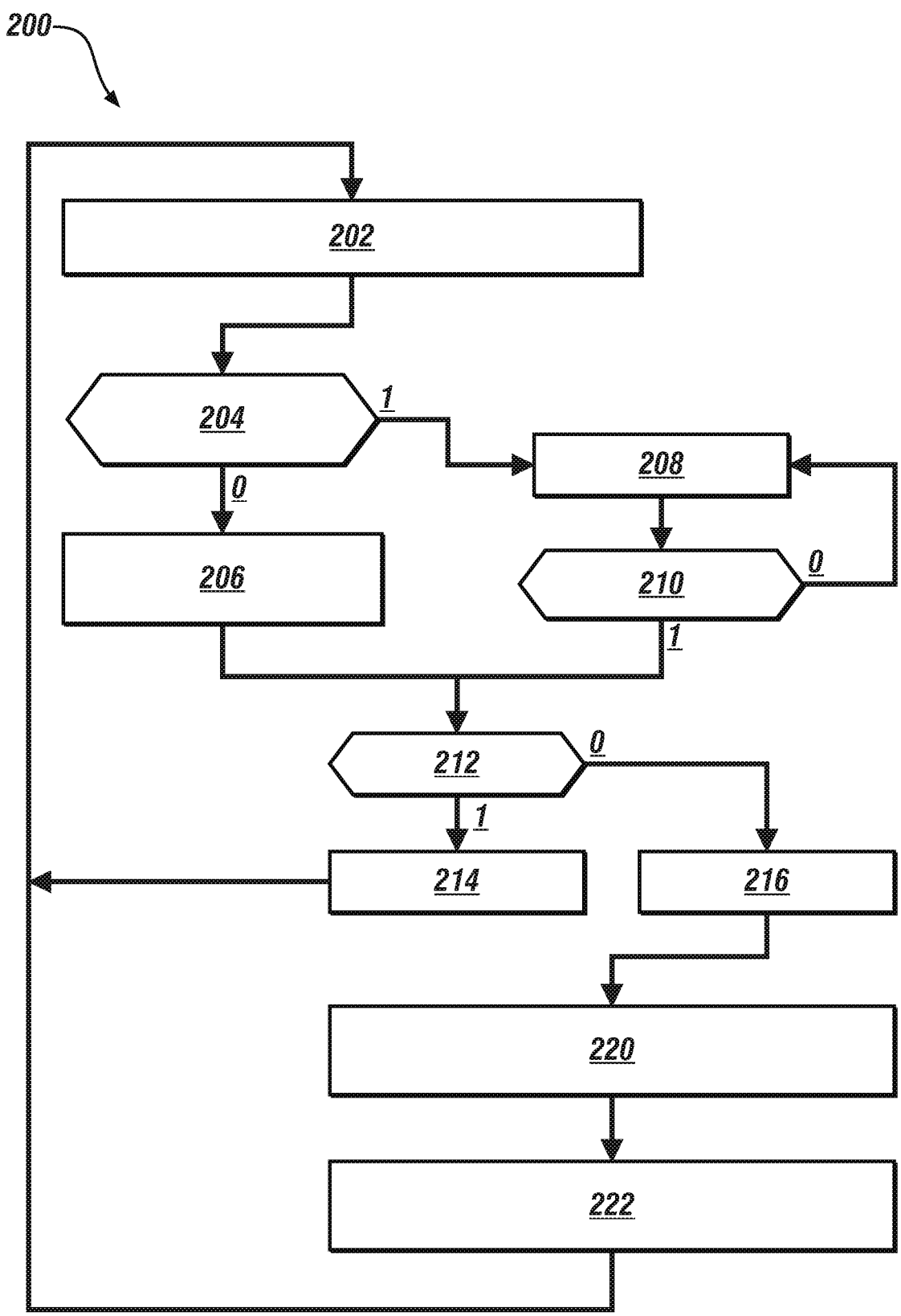
FIG. 2 schematically illustrates a flowchart for a single-cylinder-sourced EGR exhaust gas sensor cleaning routine, which may be reduced to algorithmic code that is executed by an embodiment of the engine that is described in FIG. 1 in accordance with the disclosure.

Referring now to FIG. 2, with continued reference to FIG. 1, an exhaust gas sensor cleaning routine 200 for the single-cylinder-sourced EGR system 60 is shown. The exhaust gas sensor cleaning routine 200 may be reduced to algorithmic code that is executed by an embodiment of the engine 10 that is described in FIG. 1. Table 1 is provided as a key wherein the numerically labeled blocks and the corresponding functions are set forth as follows, corresponding to the single-cylinder-sourced EGR sensor cleaning routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 202 | Monitor engine operation |
| 204 | Is rich exposure threshold exceeded? |
| 206 | Operate single-cylinder-sourced EGR system at rich air/fuel ratio |
| 208 | Wait for FCO operation |
| 210 | Is FCO active? |
| 212 | Execute sensor diagnostics |
| 214 | Implement time delay |
| 216 | Implement sensor cleaning operation |
| 218 | Open diverter valve |
| 220 | Integrate EQR, mass flow, temperature |
| 222 | Determine rich exposure limit |

Execution of the single-cylinder-sourced EGR sensor cleaning routine 200 may proceed as follows. The steps may be executed in a suitable order, and are not limited to the order described with reference to FIG. 2. As employed herein, the term "1" indicates an answer in the affirmative, or "YES", and the term "0" indicates an answer in the negative, or "NO".

The overall purpose of the single-cylinder-sourced EGR sensor cleaning routine 200 is to monitor operation of the third exhaust gas sensor 68 that is disposed to monitor the recirculated exhaust gas 41 that passes through the single-cylinder-sourced EGR system 60 back to the air intake system 14, determine when the third exhaust gas sensor 68 has had sufficient exposure to a rich exhaust gas feedstream to have experienced a level of fouling that may affect sensor signal output, and control operation of the single-cylinder-sourced EGR system 60 and other systems to expose the third exhaust gas sensor 68 to a lean exhaust gas feedstream to cause its regeneration by oxidizing, evaporating or otherwise removing some or all of the precipitated materials from a surface of the third exhaust gas sensor 68.

The routine 200 periodically executes, including monitoring or otherwise determining states of parameters associated with the recirculated exhaust gas 41, including, by way of example, an air/fuel ratio, mass flowrate, and temperature (202). The monitored parameters are accumulated, e.g., by an integrator function, to determine a rich exhaust exposure level. The mass flowrate may be determined based upon the engine speed/load operating point. The temperature and equivalence ratio of the exhaust gas from the single one of the cylinders during engine operation is determined based upon in a signal input from the third exhaust gas sensor 68, or from other sensors or models.

The rich exhaust exposure level is compared with a threshold value (204), and when the rich exhaust exposure level less than the threshold value (204)(0), operation of the single-cylinder-sourced EGR system 60 continues (206), which may include operating the single cylinder, e.g., cylinder 4, at a rich air/fuel ratio.

When the rich exhaust exposure level exceeds the threshold value (204)(1), operation of the routine 200 continues by waiting for operation in a fuel cut-off mode (FCO) (208), (210)(0). The FCO mode may be executed, by way of example, when the engine 10 is implemented on a vehicle. The FCO mode includes discontinuing engine fueling to engine cylinders when the vehicle is coasting, in order to save fuel.

When the FCO mode is activated (210)(1), the third exhaust gas sensor 68 is evaluated to determine whether any active faults have been detected.

When a fault is detected (212)(1), a time delay is implemented prior to implementing the sensor cleaning operation (214). When no fault is detected (212)(0), no time delay is implemented, the sensor cleaning operation is immediately implemented (216).

Implementing the sensor cleaning operation (216) includes opening the diverter valve 64 and causing air to flow through the single-cylinder-sourced EGR system 60. This may also include controlling a waste gate or another control element of the intake air compressor 18 coincident with controlling the exhaust gas diverter valve 64 to create a pressure differential that diverts the exhaust gas from the single cylinder, e.g., cylinder 4, to the air intake system 14 via the single-cylinder-sourced EGR system (218).

This operation exposes the exhaust gas sensor 68 to a lean exhaust gas flow, which can oxidize any soot and contaminants that may have precipitated onto the surface of the exhaust gas sensor 68. During this period of operation, the air/fuel ratio or equivalent ratio (EQR), mass flowrate, and temperature parameters continue to be monitored and accumulated, e.g., by an integrator function, to determine a lean exhaust exposure level (222). It is appreciated that air/fuel ratio is one term that may be employed to describe the exhaust gas feedstream. Other terms may include, e.g., an equivalence ratio, lambda, etc. The lean exhaust exposure level is subtracted from or otherwise employed to reduce the previously determined rich exhaust exposure level, in order to assess a need for continued operation of the single-cylinder-sourced EGR sensor cleaning routine 200. This includes discontinuing the diverting of the exhaust gas from the single one of the cylinders to the air intake system when the integrated mass flowrate of oxygen is greater than a threshold value.

As such, a method for operating an internal combustion engine (engine) including a single-cylinder-sourced EGR system controllable to divert exhaust gas from a single one of the cylinders to an air intake system of the engine, wherein an exhaust sensor is disposed to monitor the exhaust gas from the single one of the cylinders that includes determining an airflow, temperature, and an equivalence ratio of the exhaust gas from the single one of the cylinders during engine operation, amended determining exposure of the exhaust gas sensor to a rich environment during the engine operation based upon the airflow, temperature, and the equivalence ratio of the diverted exhaust gas. The exhaust gas sensor is exposed to a lean exhaust environment when the exposure of the exhaust gas sensor to the rich environment is greater than a threshold. Exposing the exhaust gas sensor to the lean exhaust environment when the monitored rich exhaust gas exposure is greater than the threshold includes determining that the engine is operating in a fuel cut-off mode, and discontinuing fuel flow to the single one of the cylinders. All or portion of the exhaust gas from the single one of the cylinders is diverted to the air intake system, while monitoring airflow, temperature, and an equivalence ratio. A mass flowrate of oxygen past the third exhaust gas sensor 68 is determined based upon the airflow, temperature, and equivalence ratio of the exhaust gas that is diverted from the single one of the cylinders, which is integrated. The diverting of the exhaust gas from the single one of the cylinders to the air intake system is discontinued only when the integrated mass flowrate of oxygen is greater than a threshold value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a multi-cylinder internal combustion engine (engine) including an exhaust system and a single-cylinder-sourced EGR (exhaust gas recirculation) system including a diverter valve disposed in an exhaust runner associated with the single cylinder source, and controllable to divert exhaust gas from a single cylinder to an air intake system of the engine, wherein an exhaust sensor is disposed to monitor exhaust gas from the single cylinder source, the method comprising:
   determining operation of the engine in a fuel cut-off mode;
   discontinuing fuel flow to the single cylinder source; and
   diverting exhaust flow from the single cylinder source to the air intake system during the operation of the engine in the fuel cut-off mode including controlling the diverter valve to divert the exhaust flow from the single cylinder source to the air intake system and coincidentally controlling the engine air compressor.

2. The method of claim 1, wherein controlling the engine air compressor coincident with controlling the diverter valve to divert the exhaust flow from the single cylinder source to the air intake system comprises controlling one of a waste gate or a position of vanes of the engine air compressor.

3. The method of claim 1, further comprising:
   determining an airflow, temperature, and an equivalence ratio of the exhaust flow that is diverted from the single cylinder source;
   determining a mass flowrate of oxygen in the diverted exhaust flow based upon the airflow, temperature, and equivalence ratio of the diverted exhaust flow from the single cylinder source; and
   integrating the mass flowrate of oxygen in the diverted exhaust flow.

4. The method of claim 3, further comprising discontinuing the diverting of the exhaust flow from the single cylinder source to the air intake system when the integrated mass flowrate of oxygen is greater than a threshold value.

5. A method for operating an internal combustion engine (engine) including a single-cylinder-sourced EGR system controllable to divert exhaust gas from a single cylinder source to an air intake system of the engine, wherein an exhaust sensor is disposed to monitor the exhaust gas from the single cylinder source, the method comprising:
   determining an airflow, temperature, and an equivalence ratio of the exhaust flow from the single cylinder source during engine operation;
   determining exposure of the exhaust gas sensor to a rich environment during the engine operation based upon the airflow, temperature, and the equivalence ratio of the diverted exhaust flow; and
   exposing the exhaust gas sensor to a lean exhaust environment when the exposure of the exhaust gas sensor to the rich environment is greater than a threshold.

6. The method of claim 5, wherein exposing the exhaust gas sensor to the lean exhaust environment when the monitored rich exhaust gas exposure is greater than the threshold comprises:
   determining operation of the engine in a fuel cut-off mode;
   discontinuing fuel flow to the single cylinder source;
   diverting exhaust flow from the single cylinder source to the air intake system;
   determining an airflow, temperature, and an equivalence ratio of the exhaust flow that is diverted from the single cylinder source;
   determining a mass flowrate of oxygen based upon the airflow, temperature, and equivalence ratio of the exhaust flow that is diverted from the single cylinder source;
   integrating the mass flowrate of oxygen;
   discontinuing the diverting of the exhaust flow from the single cylinder source to the air intake system when the integrated mass flowrate of oxygen is greater than a threshold value.

7. The method of claim 5, wherein the airflow of the exhaust flow from the single cylinder source during engine operation is determined based upon a present engine speed and load operating point.

8. The method of claim 5, wherein the temperature and equivalence ratio of the exhaust flow from the single cylinder source during engine operation is determined based upon in a signal input from the exhaust sensor disposed to monitor the exhaust gas from the single cylinder source.

9. A multi-cylinder internal combustion engine (engine), comprising:
   an air intake system and an exhaust system;
   a single cylinder source;
   a single-cylinder-sourced EGR system controllable to divert exhaust gas from the single cylinder source to the air intake system of the engine,
   an exhaust sensor disposed to monitor exhaust gas from the single cylinder source,
   a diverter valve, disposed in the exhaust system to manage flow of exhaust gas between the single cylinder source, the exhaust system and the single-cylinder-sourced EGR system; and
   a controller, in communication with the exhaust sensor, the internal combustion engine, and operatively connected to the diverter valve, the controller including an instruction set, the instruction set executable to:

determine operation of the engine in a fuel cut-off mode, discontinue fuel flow to the single cylinder source, divert exhaust flow from the single cylinder source to the air intake system, determine an airflow, temperature, and an equivalence ratio of the exhaust flow diverted from the single cylinder source, determine a mass flowrate of oxygen in the diverted exhaust flow based upon the airflow, temperature, and equivalence ratio of the diverted exhaust flow from the single cylinder source, integrate the mass flowrate of oxygen in the diverted exhaust flow, and discontinue the diverting of the exhaust flow from the single cylinder source to the air intake system when the integrated mass flowrate of oxygen is greater than a threshold value.

10. The multi-cylinder engine of claim 9, wherein the exhaust sensor comprises a wide-range air/fuel ratio sensor.

11. The multi-cylinder engine of claim 9, wherein the exhaust sensor comprises a NOx sensor.

12. The multi-cylinder engine of claim 9, wherein the single-cylinder-sourced EGR system includes a diverter valve disposed in an exhaust runner associated with the single cylinder source, and wherein the instruction set executable to divert the exhaust flow from the single cylinder source to the air intake system comprises the instruction set executable to control the diverter valve to divert the exhaust flow from the single cylinder source to the air intake system.

13. The multi-cylinder engine of claim 12, further comprising an engine air compressor disposed in the exhaust system;

wherein the instruction set executable to divert the exhaust flow from the single cylinder source to the air intake system further comprises the instruction set being executable to control the engine air compressor coincident with the control of the diverter valve to divert the exhaust flow from the single cylinder source to the air intake system.

14. The multi-cylinder engine of claim 13, wherein the instruction set executable to control the engine air compressor coincident with control of the diverter valve to divert the exhaust flow from the single cylinder source to the air intake system comprises the instruction set executable to control one of a waste gate or a position of vanes of the engine air compressor.

15. The multi-cylinder engine of claim 9, further comprising the instruction set executable to:

determine an airflow, temperature, and an equivalence ratio of the exhaust flow that is diverted from the single cylinder source;

determine a mass flowrate of oxygen in the diverted exhaust flow based upon the airflow, temperature, and equivalence ratio of the diverted exhaust flow from the single cylinder source; and integrate the mass flowrate of oxygen in the diverted exhaust flow.

16. The multi-cylinder engine of claim 9, further comprising the instruction set executable to discontinue the diverting of the exhaust flow from the single cylinder source to the air intake system when the integrated mass flowrate of oxygen is greater than a threshold value.

17. The multi-cylinder engine of claim 9, wherein the engine air compressor comprises a turbocharger or a supercharger.

* * * * *